Patented Aug. 18, 1931

1,819,770

UNITED STATES PATENT OFFICE

JEAN D'ANS, OF BERLIN, GERMANY, ASSIGNOR TO DEUTSCHE GASGLUHLICHT-AUER-GESELLSCHAFT MIT BESCHRANKTER HAFTUNG, OF BERLIN, GERMANY, A CORPORATION OF GERMANY

PROCESS FOR DECOMPOSING ORES OF THE RARE EARTHS, OF ZIRCONIUM AND TITANIUM, IN A CYCLE BY MEANS OF SULPHURIC ACID

No Drawing. Application filed May 12, 1928, Serial No. 277,396, and in Germany May 23, 1927.

It has been proposed to treat ores of zirconium, titanium, or of the metals of the rare earths, with sulphuric acid, thereby obtaining the sulfates of the metals contained in the ores treated. The sulfates thus obtained can be converted into oxides in an economical and practical manner by roasting, for instance the zirconium sulfate into zirconium oxide. In the same manner waste sulfates for instance iron sulfates can be treated. The comparatively large quantities of $SO_2$ and $SO_3$ which are obtained during the roasting of these various sulfates must be removed in order to save the surrounding districts from damage, which removal is effected by comparatively complex apparatus. An economical recovery was not possible up to the present time, and the waste sulfur oxides constituted a complete loss.

The process according to the invention provides a simple treatment, with good yield and economy, of those ores of the rare earths which are adapted to be decomposed by means of sulphuric acid, as well as ores of zirconium and titanium, and such process also provides for the utilization of the $SO_2$ and $SO_3$ obtained by roasting. According to the invention, the hot gases containing $SO_2$ and $SO_3$ coming from the roasting furnace, are passed in a second furnace over finely pulverized ores. If suitable temperatures are maintained both $SO_3$ and $SO_2$ will be absorbed. In order to ensure the absorption of the latter ($SO_2$), the necessary quantities of oxygen or air must be present in said gases, in order to render possible its conversion, by oxidation, to the sulfate stage. According to well known laws the temperature must be so controlled, that it will remain below the temperature of decomposition for the sulfates, which temperature is a definite one under given conditions.

The ore, subjected to such preliminary treatment and thereby partially sulfated is then passed to be treated with sulphuric acid for the purpose of decomposition. In this way I reduce the amount of sulphuric acid required, in a measure corresponding to the extent to which the ore has become partly sulfated during the treatment referred to, and the decomposition of ores by sulphuric acid is carried out much quicker and better if they have been subjected to such preliminary treatment.

During the roasting as well as during the treatment of the ores with gases containing $SO_2$ and $SO_3$ it is of great advantage to agitate the material during the process. Thus the process can be carried through in a suitable and practical manner in two rotary kilns or furnaces arranged in tandem or series. During the sulfation a very thorough mixing, rubbing and pulverizing of the material is of advantage.

The process is particularly adapted for the treatment of ores containing zirconia (favas), or for instance for decomposing titanium ores. In addition this process is also available for the treatment of the residues, still containing a high percentage of titanium, which are obtained by the decomposition of titanium ores by means of sulphuric acid.

The process possesses the great technical and economical advantage that it allows in the simplest manner of the cyclic use of a large portion of the sulphuric acid required for decomposition.

It is even possible with this cycle to introduce fresh quantities of sulfur oxides, which are intended to make up for the inevitable losses in sulphuric acid. For this purpose, during the roasting of the sulfates, I add to the gases liberated by roasting before the furnace in which these gases containing $SO_2$ and $SO_3$ act on the ore, gases containing $SO_2$, which are obtained by burning for instance sulfur or sulfides.

In detail, the process may be carried out as follows:

The ore to be treated (whether an ore of a metal of the rare earths, or zirconium ore, or titanium ore) is suitably comminuted or pulverized and placed in a suitable sulfating furnace in which I maintain a temperature of, say, 450° to 550° C. Into this furnace I introduce, as a treating agent, a gaseous mixture containing $SO_2$ and $SO_3$ and also a sufficient amount of air or oxygen to oxidize the $SO_2$ and enable it to effect a partial conversion of the ore into the sulfate form. The partially sulfated ore thus obtained is then removed from the furnace and treated with sulphuric acid in the well-known manner, whereby the conversion of the ore into sulfate form is completed. The resulting product is placed in a roasting furnace and heated to a temperature of, say, 800° C. As a result of this treatment, the sulfate is converted into the form of oxide (for instance, titanium oxide, $TiO_2$, if the ore was a titanium ore), and this oxide product is available for industrial and other uses, for instance as a pigment. The roasting treatment also produces roasting gases containing $SO_2$ and $SO_3$, and these roasting gases, with the addition of a suitable amount of oxygen and sometimes of $SO_2$ (to increase the partial sulfating of the ore) are introduced into the sulfating furnace mentioned above and constitute the gaseous treating agent above referred to.

While in the appended claims I have referred to treating materials which contain titanium, it will be understood that exactly the same treatment may be applied to materials containing zirconium or metals of the rare earths, and said claims are therefore to be interpreted as covering such equivalents.

I claim:

1. A cyclic process for the treatment of titanium-bearing material which includes treating the comminuted material, under application of heat, with gases containing $SO_2$ and $SO_3$ and an addition of oxygen, whereby said material is partly converted into sulfate form, treating the partly converted material with sulphuric acid to continue its conversion into sulfate form, roasting this converted sulfate material to convert it from the sulfate form to the oxide form and to obtain gases containing $SO_2$ and $SO_3$, and utilizing these gases, with an addition of oxygen, in the treatment step first mentioned.

2. A process according to claim 1, in which the gases produced by roasting and containing $SO_2$ and $SO_3$ receive an addition of $SO_2$ (or of sulfur material to produce $SO_2$).

3. A process for the treatment of titanium-bearing material, which includes treating the comminuted material, under application of heat, with gases containing $SO_2$ and $SO_3$ and an addition of oxygen, whereby said material is partly converted into sulfate form, treating the partly converted material with sulphuric acid to continue its conversion into sulfate form, and roasting this converted sulfate material to convert it from the sulfate form to the oxide form.

4. A process according to claim 3, in which the material is agitated during its treatment with gases containing $SO_2$, $SO_3$, and oxygen.

5. In a process for decomposing ores of the rare earths, of zirconium and titanium, by means of sulphuric acid in a cycle, roasting the waste of sulphates obtained during the treatment of ores to oxides, passing the gases generated thereby and containing $SO_2$ and $SO_3$ over the finely pulverized ores in the heat with the necessary addition of oxygen, whereupon the sulphatized ores are subjected to decomposition by means of sulphuric acid.

6. In a process for decomposing ores of the rare earths, of zirconium and titanium, by means of sulphuric acid in a cycle, roasting the waste of sulphates obtained during the treatment of ores to oxides, passing the gases generated thereby and containing $SO_2$ and $SO_3$ over the finely pulverized ores in the heat with the necessary addition of air, whereupon the sulphatized ores are subjected to decomposition by means of sulphuric acid.

In testimony whereof I affix my signature.

JEAN D'ANS.